United States Patent [19]
Binkley et al.

[11] Patent Number: 5,106,556
[45] Date of Patent: * Apr. 21, 1992

[54] METHOD OF DOWNCOER-TRAY VAPOR VENTING

[75] Inventors: Michael J. Binkley, Glenn Heights; John T. Thorngren, Dallas; Gary W. Gage, Grand Prairie; Jorge A. Bonilla, Dallas; Daniel H. Beckman, Waxahachie, all of Tex.

[73] Assignee: Glitsch, Inc., Dallas, Tex.

[*] Notice: The portion of the term of this patent subsequent to Sep. 11, 2007 has been disclaimed.

[21] Appl. No.: 725,365

[22] Filed: Jun. 25, 1991

Related U.S. Application Data

[63] Continuation of Ser. No. 490,778, Mar. 8, 1990, abandoned, which is a continuation-in-part of Ser. No. 320,420, Mar. 8, 1989, Pat. No. 4,956,127.

[51] Int. Cl.$^5$ ................................. B01F 3/04
[52] U.S. Cl. ................. 261/114.1; 261/114.3
[58] Field of Search ................ 261/114.1, 114.3

[56] References Cited

U.S. PATENT DOCUMENTS

| | | | |
|---|---|---|---|
| 2,582,826 | 1/1952 | Glitsch . | |
| 2,611,596 | 5/1954 | Glitsch . | |
| 2,693,949 | 11/1954 | Huggins | 261/114.1 |
| 2,757,915 | 8/1956 | Huggins | 261/114.1 |
| 2,762,692 | 9/1956 | Spitz et al. | 261/114.1 |
| 2,787,453 | 4/1957 | Hibshman et al. . | |
| 2,951,691 | 9/1960 | Nutter . | |
| 3,008,553 | 11/1961 | Glitsch . | |
| 3,013,782 | 12/1961 | Glitsch . | |
| 3,079,184 | 2/1963 | Winn . | |
| 3,080,155 | 3/1963 | Glitsch . | |
| 3,087,711 | 4/1962 | Glitsch . | |
| 3,125,614 | 3/1964 | Mayfield et al. . | |
| 3,233,708 | 2/1966 | Glitsch . | |
| 3,282,576 | 11/1966 | Bruckert et al. | 261/114.3 |
| 3,343,321 | 9/1967 | Winn et al. . | |
| 3,410,540 | 11/1968 | Bruckert . | |
| 3,464,679 | 9/1969 | Becker | 261/114.1 |
| 3,467365 | 9/1969 | Webster | 261/114.1 |
| 3,550,916 | 12/1970 | Hoppe . | |
| 3,784,175 | 1/1974 | Hirao . | |
| 3,959,419 | 5/1976 | Kitterman | 261/98 |
| 3,969,447 | 7/1976 | Glitsch . | |
| 4,049,319 | 9/1976 | Nye | 261/114.1 |
| 4,101,610 | 7/1978 | Kirkpatrick . | |
| 4,123,008 | 10/1978 | McClain . | |
| 4,198,002 | 4/1980 | McClain . | |
| 4,275,021 | 6/1981 | Kirkpatrick . | |
| 4,499,035 | 2/1985 | Kirkpatrick et al. . | |
| 4,504,426 | 3/1985 | Chuang et al. . | |
| 4,543,219 | 9/1985 | Yamato et al. . | |
| 4,543,219 | 9/1985 | Yamato et al. | 261/109 |
| 4,550,000 | 10/1985 | Bentham | 261/114.1 |
| 4,597,916 | 7/1986 | Chen | 261/112.2 |
| 4,601,788 | 7/1986 | Bannon | 202/153 |
| 4,603,022 | 7/1986 | Yoneda et al. | 261/114.1 |
| 4,604,247 | 8/1986 | Chen et al. | 261/112.2 |
| 4,623,493 | 11/1986 | Bentham | 261/109 |
| 4,627,941 | 12/1986 | Bentham | 261/114.1 |
| 4,729,857 | 3/1988 | Lee et al. . | |
| 4,842,778 | 6/1989 | Chen et al. . | |
| 4,909,967 | 3/1990 | Binkley et al. . | |
| 5,047,179 | 9/1991 | Nye | 261/114.1 |

FOREIGN PATENT DOCUMENTS

| | | | |
|---|---|---|---|
| 2267812 | 11/1975 | France . | |
| 602203 | 5/1975 | U.S.S.R. . | |
| 510247 | 4/1976 | U.S.S.R. | 261/114.3 |
| 997706 | 2/1983 | U.S.S.R. | 261/114.3 |
| 2092175 | 8/1982 | United Kingdom . | |

OTHER PUBLICATIONS

Sketch of "M-D" Tray General Arrangement, Glitch, Inc., Dallas Texas
Chen, Packed Column Internals, Chem. Engr., Mar. 5, 1984, pp. 40-51.
Linde Multiple Downcomer Trays, Union Carbide Corp., P.O. Box 44, Tonawanda, NY 14150.

*Primary Examiner*—Tim Miles
*Attorney, Agent, or Firm*—Johnson & Gibbs

[57] ABSTRACT

A downcomer tray assembly for vapor liquid contact towers. The region of the tray beneath an upper downcomer is constructed with a raised, perforated region for improving mass transfer efficiency. The raised region reduces fluid pressure to vent excess vapor from the underlying tray. The vented vapor is selectively directed into the liquid discharged from the downcomer and imparted with a horizontal flow characteristic. In this manner both entrained liquid and entrained gas can be effectively released to facilitate a stabilized vapor-liquid flow configuration.

11 Claims, 4 Drawing Sheets

METHOD OF DOWNCOER-TRAY VAPOR VENTING

This is a continuation of application Ser. No. 07/490,778, filed Mar. 8, 1990, now abandoned, which is a continuation-in-part of application Ser. No. 07/320,420, filed Mar. 8, 1989, now U.S. Pat. No. 4,956,127.

BACKGROUND OF THE INVENTION

1. Field of the Invention

The present invention pertains to gas-liquid contacting trays and, more particularly, an improved downcomer-tray assembly incorporating a raised, active inlet area beneath the downcomer for venting excess vapor pressure from the underlying tray.

2. History of the Prior Art

Distillation columns are utilized to separate selected components from a multicomponent stream. Generally, such gas-liquid contact columns utilize either trays, packing or combinations thereof. In recent years the trend has been to replace the so-called "bubble caps" by sieve and valve trays in most tray column designs, and the popularity of packed columns, either random (dumped) or structured packing have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays come in two configurations: cross-flow and counter flow. The trays generally consist of a solid tray or deck having a plurality of apertures and are installed on support rings within the tower. In cross-flow trays, vapor ascends through the apertures and contacts the liquid moving across the tray; through the "active" area thereof; in this area liquid and vapor mix and fractionation occurs. The liquid is directed onto the tray by means of a vertical channel from the tray above. This channel is referred to as the Inlet Downcomer. The liquid moves across the tray and exists through a similar channel referred to as the Exit Downcomer. The location of the downcomers determine the flow pattern of the liquid. If there are two Inlet Downcomers and the liquid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) liquid rate increases. It is the active area of the tray, however, which is of critical concern.

Not all areas of a tray are active for vapor-liquid contact. For example, the area under the Inlet Downcomer is generally a solid region. To attempt to gain more area of the tray for vapor/liquid contact, the downcomers are often sloped. The maximum vapor/liquid handling capacity of the tray generally increases with an increase in the active or Bubbling Area. There is, however, a limit as to how far one can slope the downcomer(s) in order to increase the Bubbling Area otherwise the channel will become too small. This can restrict the flow of the liquid and/or restrict the disengagement of vapor retained in the liquid, cause liquid to back up in the downcomer, and thus prematurely limit the normal maximum vapor/liquid handling capacity of the tray. The present invention specifically addresses the problem of restricted disengagement of vapor retained in the liquid.

A variation for increasing the Bubbling Area and hence vapor/liquid handling capacity is a Multiple Downcomer (MD) tray. There is usually a plurality of box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern is rotated 90 degrees between successive trays. The bottom of the boxes is solid except for slots that direct the liquid onto the Bubbling Area of the tray below, in between the outlet downcomers of said tray. The MD tray falls into the category of Multipass Trays and is usually used for high liquid rates.

Addressing now select cross flow plate designs, a particularly effective tray in process columns is the sieve tray. This tray is constructed with a large number of apertures formed in the bottom surface. The apertures permit the ascending vapor to flow into direct engagement with the liquid that is flowing across the tray from the downcomer described above. When there is sufficient vapor flow upwardly through the tray, the liquid is prevented from running downwardly through the apertures (referred to as "weeping"). A small degree of weeping is normal in trays while a larger degree of weeping is detrimental to the capacity and efficiency of a tray.

The capacity of a tray is a function of the open area of holes and of tray spacing. When spacing is fixed, capacity may be increased by increasing the percent open area, but this practice is limited by decreased turndown due to weeping at low vapor rates. To overcome such weeping, a tray has been developed which is constructed from closely spaced rods of trapezoidal cross-section. They are manufactured and sold by the assignee of the present invention under the trademark SCREEN TRAY.

The trapezoidal wire members of the SCREEN TRAY are tapered upwardly, and this creates a Venturi effect to ascending vapor. Surface tension effects become pronounced with such close wire spacing. Combined with the Venturi effect produced by vapor rising through the tapered throats between the wires, surface tension phenomena reduce weeping significantly at low liquid rates and keep spray height low. The upward taper also defines a larger surface area for liquid flowing across the tray. For additional discussions of SCREEN TRAYS and another invention related thereto which improve gas-liquid contact, reference is made to copending, U.S. patent application Ser. No. 07/304,942 filed on Jan. 31, 1989 and assigned to the assignee of the present invention.

Tray efficiency is also known to be improved in sieve type trays by increasing the froth height of the liquid and reducing the backflow of the liquid flowing across the tray. Froth is created when vapor bubbles percolate upwardly through the liquid flowing across the tray. The suspension of the vapor in the liquid prolongs the vapor liquid contact which enhances the efficiency of the process. The longer the froth is maintained and the higher the froth is established, the greater the vapor liquid retention. Higher froth requires smaller vapor bubbles and the formation of the bubbles at a sufficiently slow rate. Likewise, backflow occurs beneath the froth when circulating currents of liquid are established during the liquid flow across the plate. This generally forms along the lateral portions thereof. These currents carry liquid back across the tray in a manner that reduces the concentration-difference driving force for mass transfer. It is the concentration-difference between the vapor and the liquid which enhances the effectiveness of the vapor-liquid contact.

The concentration-difference between the vapor and the liquid can be effected in many ways; some reducing efficiency. For example, as operating pressure increases, descending liquid begins to absorb vapor as it moves across a tray. This is above that normally associated as dissolved gas as governed by Henry's Law and represents much larger amounts of vapor bubbles that are commingled or "entrained" with the liquid. This vapor is not firmly held and is released within the downcomer, and, in fact, the majority of said vapor must be released otherwise the downcomer can not accommodate the liquid/vapor mixture and will flood thus preventing successful tower operation.

This phenomena is generally deemed to occur when operating pressure is such as to produce a vapor density above about 1.0 lbs/cu. ft. and typically amounts to about 10 to 20% of the vapor by volume.

For conventional trays as shown below, the released vapor must oppose the descending frothy vapor/liquid mixture flowing over the weir into the downcomer In many cases, such opposition leads to poor tower operation and premature flooding.

Another serious problem which manifests itself in such operational applications is entrainment of liquid droplets in the ascending vapor. This phenomenon, which is virtually the opposite of the above vapor entrainment, can prevent effective vapor liquid contact. Liquid entrainment is, in one sense, a dynamic flow condition. High velocity vapor flow can suspend descending liquid droplets and prevent their effective passage through the underlying froth mixture zone. It is particularly difficult to prevent this problem when the tower applications require high volume vapor flow in a direction virtually opposite to that of high volume, descending liquid flow.

The technology of gas-liquid contact addresses many performance issues. Examples are seen in several prior art patents, which include U.S. Pat. Nos. 3,959,4119, 4,604,247 and 4,597,916, each assigned to the assignee of the present invention and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings secured to the tray deck beneath the downcomers for breaking up the descending liquid flow. Such advances improve tray efficiency within the confines of prior art structures. Likewise, U.S. Pat. No. 4,543,219 assigned to Nippon Kayaku Kabushiki Kaisha of Tokyo, Japan teaches a baffle tray tower. The operational parameters of high gas-liquid contact efficiency and the need for low pressure loss are set forth. Such references are useful in illustrating the need for high efficiency vapor liquid contact in tray process towers. U.S. Pat. No. 4,504,426 issued to Carl T. Chuang et. al. and assigned to Atomic Energy of Canada Limited is yet another example of gas-liquid contacting apparatus. This reference likewise teaches the multitude of advantages in improving efficiency in fractionation and modifications in downcomer-tray designs. The perforated area of the tray is extended beneath the downcomer with between 0 to 25% less perforation area.

Yet another reference is seen in U.S. Pat. No. 3,410,540 issued to W. Bruckert in 1968. A downcomer outlet baffle is therein shown to control the discharge of liquid therefrom. The baffle may include either a static seal or dynamic seal. In this regard the openings from the downcomer are sufficiently small to control discharge and may be larger than the tray perforations and of circular or rectangular shape. The transient forces which may disrupt the operation of a downcomer are also more fully elaborated therein. These forces and related vapor-liquid flow problems must be considered for each application in which a downcomer feeds an underlying tray.

It would be an advantage to provide a method of and apparatus for enhanced downcomer-tray vapor flow manifesting increased efficiency in the venting of entrained vapor, controlled vapor flow beneath the discharge area of a downcomer and directionalized vapor flow across the tray to facilitate the release of entrained liquid. Such a downcomer-tray assembly is provided by the present invention wherein a uniformly raised, active inlet area panel is secured beneath an angulated downcomer. The panel has a plurality of apertures, some including flow vanes, disposed beneath the sloped downcomer, for providing vapor injection into the liquid flow which is effective in achieving greater vapor-liquid handling capacity. Likewise, the momentum of the falling liquid which tends to cause weeping through the tray below is substantially prevented by the effective vapor flow through the raised, active inlet panel.

SUMMARY OF THE INVENTION

The present invention pertains to enhanced downcomer-tray vapor flow for a process column. More particularly, one aspect of the invention includes an improved downcomer-tray assembly for a process column of the type wherein liquid flows downwardly through a first downcomer onto a first tray and across the active area thereof. Across this active area vapor flows upwardly for interaction and mass transfer with the liquid. The liquid then passes from the tray through a second downcomer. The improvement of the present invention comprises a substantially uniformly raised, active inlet area disposed beneath the discharge area of the first downcomer for establishing vented, directionalized vapor flow beneath the downcomer and injecting vapor into direct, angulated engagement with the discharged liquid in a more horizontal configuration across the tray. In this manner, vented vapor from the tray below can aerate descending liquid while affording a horizontal flow vector thereto.

In another aspect, the invention includes the improved downcomer tray assembly described above wherein the downcomer is constructed with an angulated body for engaging the ascending vapor flow and enhancing horizontal flow characteristics therefrom. In one embodiment, the downcomer is constructed with a body portion angulated toward the raised, active inlet region for establishing a vapor flow having substantial horizontal flow characteristics. The discharge region of the downcomer may comprise a plurality of apertures formed across the lower region of the downcomer and disposed above the active inlet area and generally parallel spaced relationship thereto. In another embodiment of the present invention, the discharge region may comprise a tapered Venturi area formed thereacross and disposed above the active inlet area in generally spaced relationship thereto, the taper providing a surface against which a substantially horizontal vapor flow characteristic is formed.

In a further aspect, the invention includes an improved method of mixing vapor with liquid discharged from a downcomer of a process column onto an underlying tray with the column having a plurality of trays and downcomers spaced vertically one from the other and maintaining liquid-vapor flow stability therein. The improvement comprises forming the tray with a uniformly raised, active inlet area having vapor flow openings therein disposed beneath the discharge area of the downcomer and venting vapor through the uniformly raised, active inlet area from the downcomer and tray region thereunder. The vented vapor is vectored into engagement with the discharged liquid and outwardly from the inlet area and the downcomer.

In yet another aspect of the invention, the raised inlet panel comprises a venting region having a sufficient number of apertures for venting vapor from the tray therebeneath. In this configuration vapor is vented from the underlying tray to the adjacent tray with a predefined flow pattern maximizing efficiency therein. The tray itself may comprise a sieve tray. A particular sieve tray contemplated by the present invention includes one that is constructed of a plurality of wires having a generally trapezoidal cross section and secured one to the other in generally parallel spaced relationship.

In yet a further aspect, the present invention includes an improved method of mixing vapor with liquid discharge from a downcomer of a process column onto an underlying cross flow tray of the type wherein descending liquid mixes with ascending vapor flow through the tray. The improvement comprises the steps of disposing a raised, active inlet area beneath the downcomer adjacent the tray, imparting preferential horizontal vapor flow through the active inlet area relative to the tray and directionalizing the vapor flow at an angle into the liquid for imparting a select horizontal flow characteristic.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
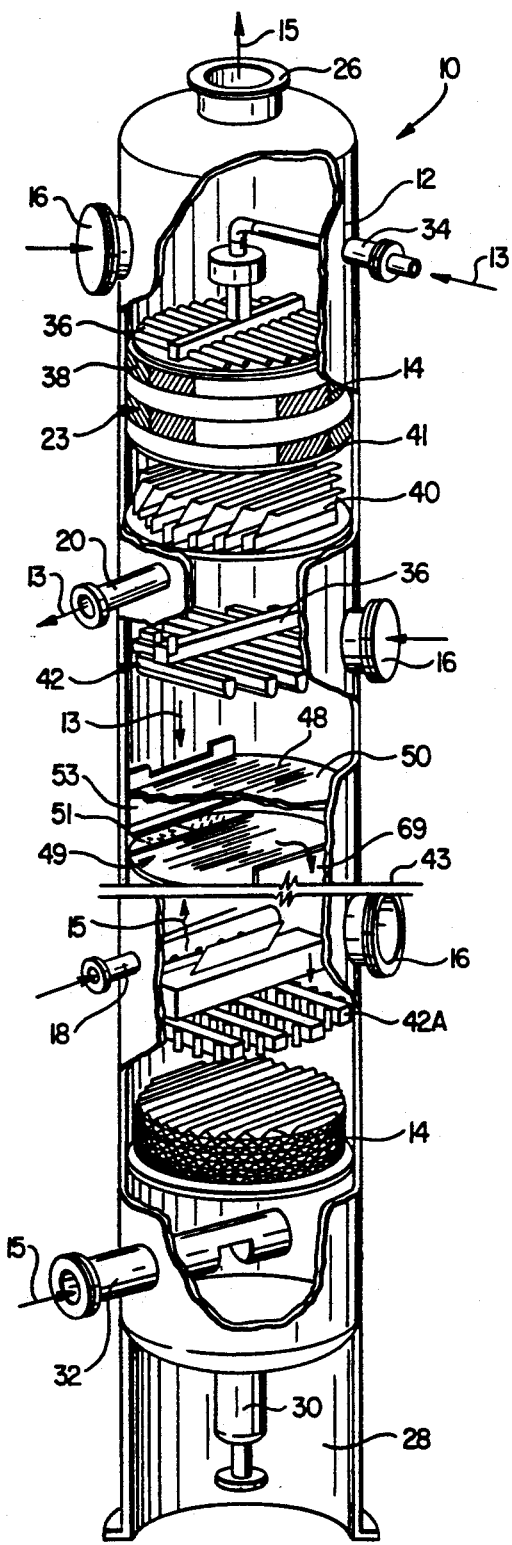
FIG. 1 is a perspective view of a packed column with various sections cut away for illustrating a variety of tower internals and one embodiment of a downcomer-tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the improved high capacity tray assembly of the present invention. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support Of the upper structured packing 38. A liquid distributor 42, adapted for redistributing liquid 13, is likewise disposed there-beneath. A second type of distributor 42A is shown below the cut-line 43 and disposed above bed 14. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Such trays comprise plates which are perforated or slotted in construction. The vapor and the liquid engage at or along the tray and, in some assemblies, are permitted to flow through the same openings in a counter-current flow arrangement. Optimally, the vapor and liquid flows reach a level of stability. With the utilization of downcomers, to be described in more detail below, this stability may be achieved with a relatively low flow rate permitting the ascending vapor to mix with the descending liquid. In some embodiments no downcomers are used and the vapor and the liquid use the same openings, alternating as the respective pressures change. But such is not the case herein.

In the present embodiment, cross-flow trays 48 and 49 and downcomers 53 and 69 are illustrated. Tray 48 is of conventional design manifesting a conventional perforated, or slotted, surface 50. Tray 49, however, includes a raised inlet section 51 beneath downcomer 53, which in accordance with the present invention is substantially planar and formed with a plurality of apertures. The downcomer 53 is also tapered downwardly, as will be described below. The apertures in the inlet section 51 can be simple perforations or directional flow vanes, as will be described below, and are the result of a myriad of critical design considerations including liquid/vapor ratios, liquid cooling, liquid flow/backmixing, foaming (froth), height, froth uniformity, the presence of solids or slurries therein and the requisite need to vent excess pressure in the underlying tray. Corrosion is likewise a consideration of the various elements in the packed towers and the selection of the material, design, and the fabrication of the tower internal is, in many instances, the result of such considerations. The anatomy of process columns as shown in FIG. 1 is likewise described in more detail in an article by Gilbert Chen, entitled "Packed Column Internals" appearing in the Mar. 5, 1984 edition of *Chemical Engineering*, incorporated herein by reference.

Figure 2:
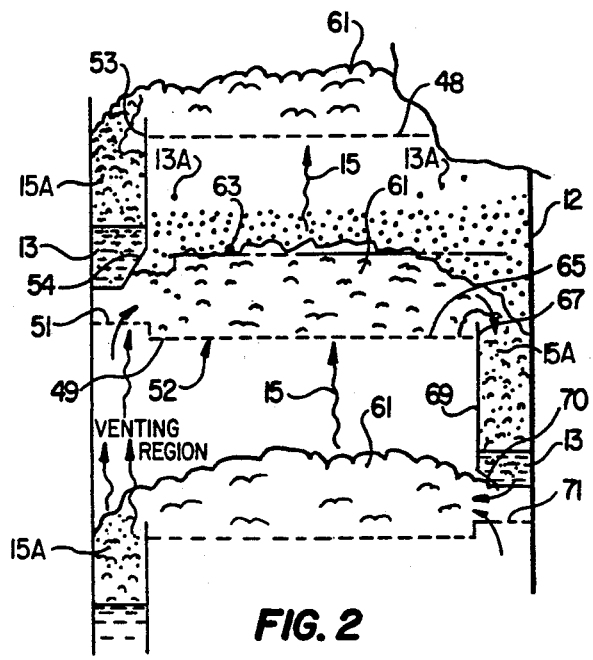
FIG. 2 is a diagrammatic, side-elevational, cross-sectional view of the improved downcomer-tray assembly of the present invention secured within a process tower and illustrating the flow of liquid and vapor thereacross.

Referring now to FIG. 2, there is shown a side-elevational, cross-sectional, diagrammatic view of several aspects of the present invention. An upper tray 48 comprises a planar panel that is perforated, as shown. The lower tray 49 is also of generally planar construction across its central active area 52. Liquid 13 travels down a downcomer 53 having a tapered or mitered bottom section 54, from tray 48 disposed thereabove. Vapor 15 is often trapped in the liquid 13, as indicated by vapor bubbles 15A shown in the liquid in the downcomers. The tapered section 54 of the downcomer provides a clearance angle for vapor flow from the active inlet area, which clearance angle affords a horizontal flow vector to the vapor vented through raised panel 51. The liquid 13 engages the vented vapor 15 discharged from the raised active panel area 51 beneath the downcomer 53. The venting region therebeneath is so labeled. Entrained gas escaping from the lower downcomer below the venting region is able to ascend directly into and through the panel area 51. Without the raised panel 51, there would be no preferential vapor flow of the gas escaping from the downcomer and it would tend to rise through the conventional active region 52. This engagement controls the direction of vented vapor and liquid flow across the central active region 52 of tray 49: the taper of the mitered section 54 imparting a horizontal flow characteristic. The raised panel 51 permits any excess vapor pressure to be vented through the panel and into a flow configuration which facilitates proper tower operation rather than creating more problems. For example, as described below, entraining liquid 13A is induced to drop out due to the flow configuration. The remaining ascending vapor 15 passing through the plurality of perforations 59 of said active region 52 may rise vertically to create a froth 61. The froth or "foam" is a region of aeration in which the phase of the liquid 13 is continuous. When the froth 61 does not exist or becomes discontinuous, an inversion to a gas-continuous regime can result in a "spray" of gas upwardly therethrough. With the downcomer-tray assembly of the present invention, the likelihood of this gas continuous regime is greatly reduced.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a mitered region 70 where the liquid accumulates and disperses upon active inlet region 71 therebeneath. Again active inlet region 71 is shown herein diagrammatically for purposes of illustration only. As stated herein, the area of holes and perforations for a single cross-flow plate establish the active length of the plate and the zone in which the froth 61 is established. It should be noted that the present invention would also be applicable more multiple downcomer configurations, wherein the downcomers and raised, active inlet areas may be positioned in intermediate areas of the trays. By increasing the total active area by active inlet areas 51 and 71 greater capacity and efficiency is achieved. It is also the manner of flow of the liquid 13 across the tray 49 which, in the present embodiment, is critical to tray efficiency. A flow diagram of a conventional sieve plate will be discussed below for purposes of illustrating the efficiency afforded by the present invention.

Figure 3:
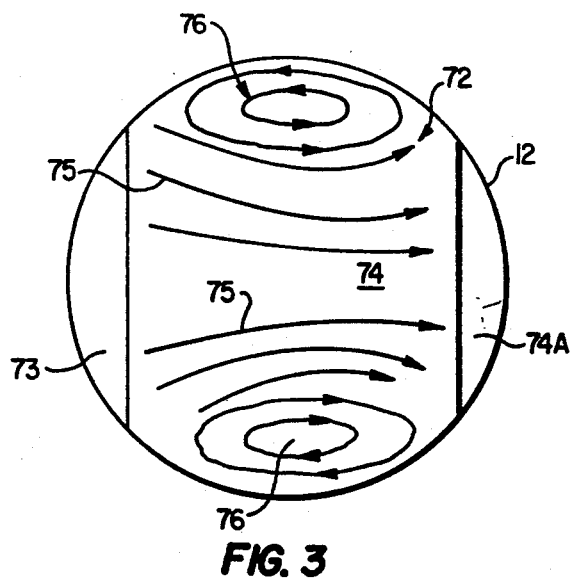
FIG. 3 is a top-plan. diagrammatic view of a prior art sieve plate illustrating the liquid flow thereacross.

Referring now to FIG. 3, there is shown a flow diagram across a conventional sieve plate. The prior art sieve plate 72 is illustrated herein as a round tray having a first conventional downcomer for feeding liquid upon a solid, underlying panel 73 and then to the tray 74. A second downcomer 74A carries liquid away from the tray. A plurality of arrows 75 illustrate the nonuniform flow of liquid 13 across a conventional plate. Recirculation cells 76 are shown to be formed on both sides of the plate lateral to the direction of flow. The formation of these retrograde flow areas, or recirculation cells, decreases the efficiency of the tray. These recirculation cells are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced, copending patent application Ser. No. 07/304,942.

Figure 4:
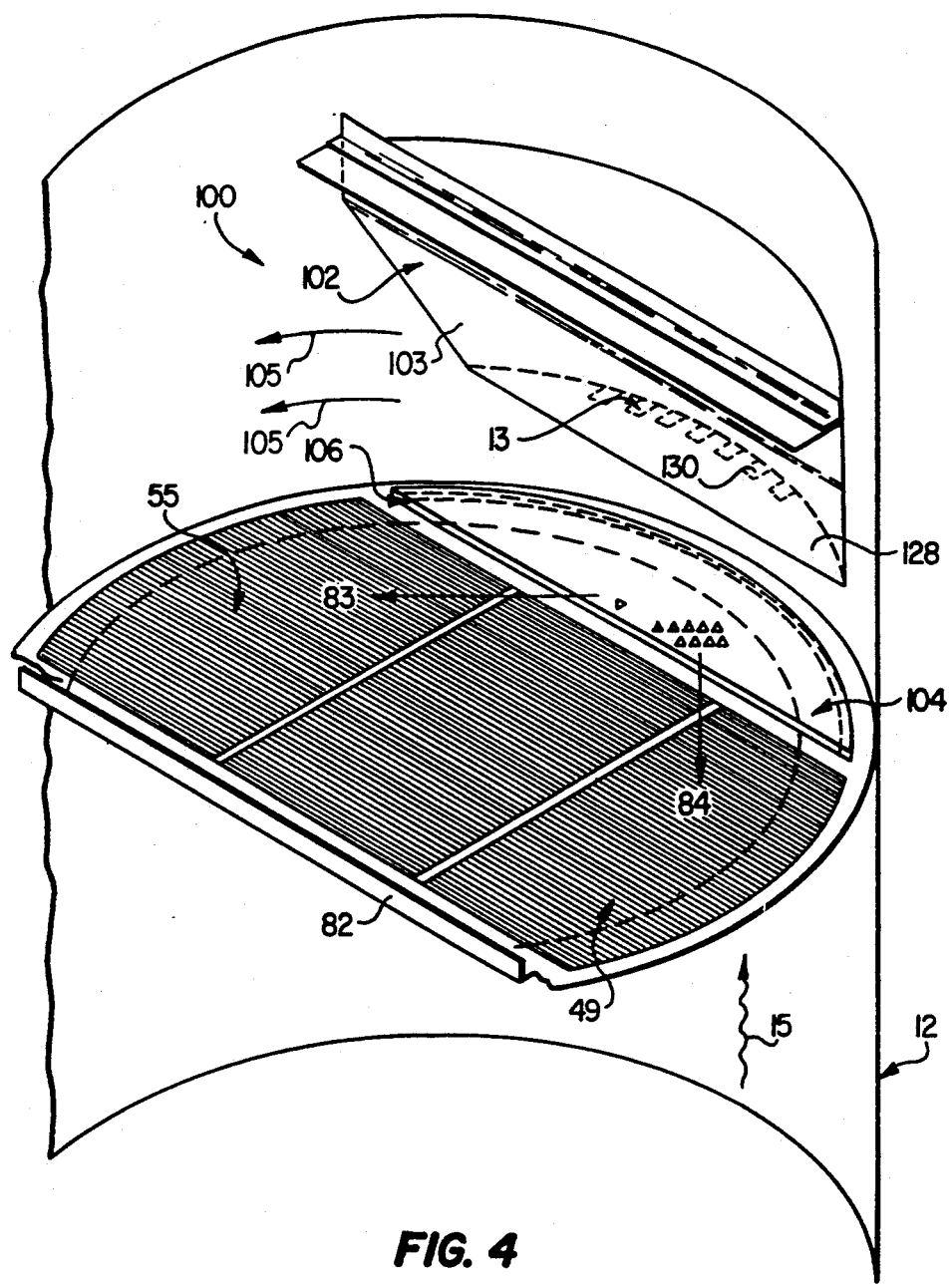
FIG. 4 is a perspective view of the downcomer-tray assembly of the present invention, with portions thereof cut away for purposes of clarity; view of an active tray area taken along lines 5—5 of FIG. 4.

Referring now to FIG. 4, there is shown an enlarged, fragmentary perspective view of a downcomer-tray assembly 100 constructed in accordance with the principles of the present invention. The tray 49 as shown herein is constructed for placement in the tower 12 whereby a feeding downcomer 102 having an inclined face 103, can be disposed over an inlet region 104 for providing liquid 13 to tray 49. A weir 82 is disposed on the opposite side of tray 49 whereby a second downcomer is disposed for carrying froth 61 and liquid 13 away from the tray 49. Liquid 13 spills down upon active inlet panel 104 and over upstanding edge 106 onto the tray 49. The liquid 13 flows across the tray in the direction of arrows 83 and 84. If the panel 104 is constructed with flow vanes, the flow directions will be induced by vapor flow from panel 104 and will be substantially uniform in accordance with the principles of the present invention and without the backflow problems discussed above. Arrows 105 reflect the horizontal flow characteristic of the vapor vented from the underlying tray, which flow characteristic is produced by the panel 104 and the inclined face 103. In this manner, two distinct advantages may be recognized. The absence of back mixing will increase the concentration-difference driving force for mass transfer between the counter-flowing streams. The horizontal vapor flow aspect represented by arrows 105 will facilitate the dropping out of liquid droplets entrained in the vapor flow 105. Such entrainment is common in towers with ascending vapor flow, but it is exacerbated with the venting flow arising from the inlet panel 104.

Figure 5:
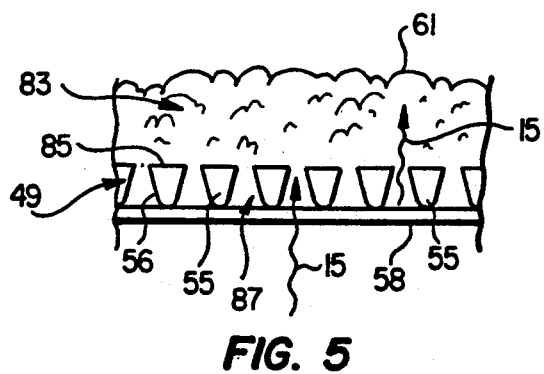

Referring now to FIG. 5, an enlarged, cross section of the tray assembly 49 is diagrammatically shown. In this embodiment, a sieve type tray is constructed with trapezoidal, or V-shaped, wires 55. It is incorporated into a SCREEN TRAY type sieve tray embodiment. SCREEN TRAY is a trademark of the assignee of the present invention and represents the central active area of tray 49 constructed with the array of V-shaped wires 55 disposed in generally parallel spaced relationship. The adjacent V-shaped wires 55 are secured by cross members 58 and form a "Venturi" shaped slit 87 between each of the wires resulting in very low energy loss. The relative size of the mesh 51 and tray 49 are not to scale and are presented by illustrating the tray assembly. Each wire 55 has a trapezoidal outer perimeter surface 56 forming the above defined tapered slit 87. Such a tray operates in the froth regime at maximum efficiency over a wide range of conditions. Gas 15 is thus shown rising to engage liquid 13 flowing orthogonal thereto from the downcomer 102 of FIG. The result is a turbulent pattern of gas and liquid engagement effecting efficient mass transfer. Likewise, froth height is maximized, entrainment is minimized and low pressure drop results in reduced downcomer backup. The directionalized flow from the raised, active inlet panel 104 provides an enhancement in tray efficiency, with minimum height. It should also be noted that any style of apertures could be incorporated into the active area of tray 49. Although V-shaped wires are shown, bubble cap trays, other slotted openings, perforations, valves (both fixed and moveable) could be used with the present invention.

Figure 6:
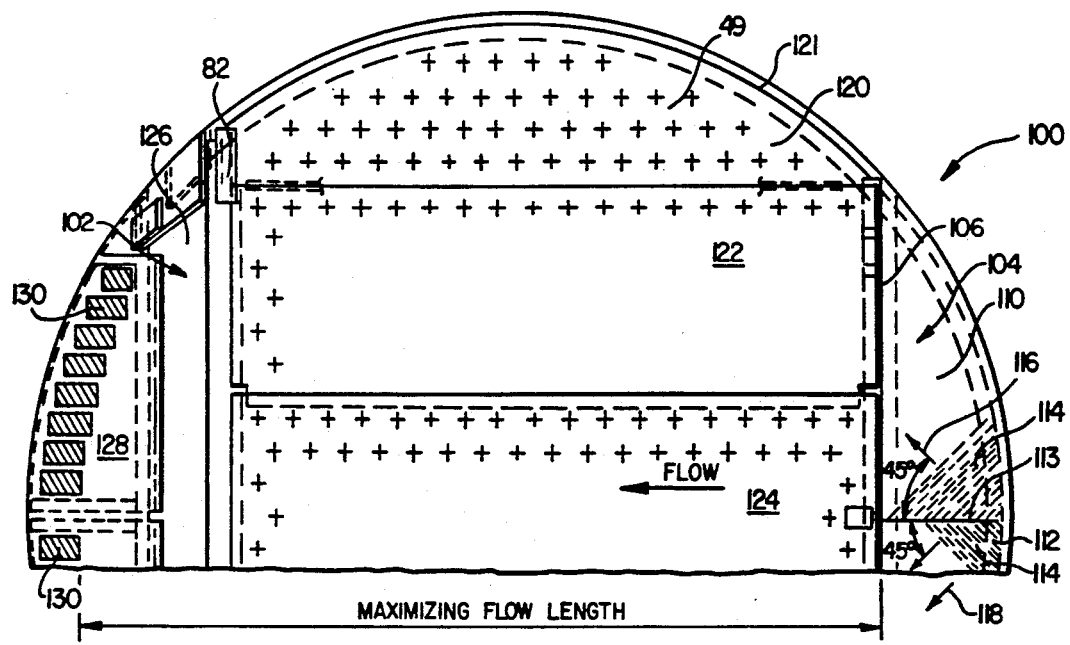
FIG. 6 is an enlarged, top plan view of the tray assembly of FIG. 4.

Referring now to FIG. 6, there is shown an enlarged top plan view of the tray 49 of FIG. 4. The tray 49 is constructed with a plurality of panel sections. These sections are not shown with aperture detail for purposes of clarity. Section 120 comprises an outer panel having an arcuate side wall 121. Panel 122 is secured adjacent panel 120 and is comprised of generally rectangular configuration. Panel 124 is likewise secured adjacent panel 122 and likewise comprises a generally rectangular configuration. Each of the panels 120, 122 and 124 are constructed of the appropriate tray material such as the sieve tray construction shown in FIG. 5. It may be seen that upstanding edge 106 is shown separating the trays 122 and 124 from the raised inlet panel 104.

Still referring to FIG. 6, the relative proportion of sizes between active inlet panel 104 and the central active area of tray 49 can be seen. Panel 104, in this particular embodiment, is comprised of first and second panel sections 110 and 112 which are welded together across abutting joint 113 in abutting seam 113. Each panel 110 and 112 is constructed with louvers 114 facing in selected directions. Louvers 114 of panel 110 are angled to vector vapor flow in the direction of arrow 116. Likewise, louvers 114 and panel 112 are angled to vector vapor flow in the direction of arrow 118. The select vapor and liquid flow then occurs across the panels 120, 122 and 124 to the opposite downcomer. A downcomer panel 126 is shown sloped downwardly to a bottom discharge plate 128 in which rectangular apertures 130 are formed in the outermost section thereof. In this manner, the flow path of discharge liquid is maximized across the tray. Maximizing the length of travel of the liquid maximizes the tray efficiency, which aspect is labeled beneath the drawing of FIG. 6.

Figure 7:
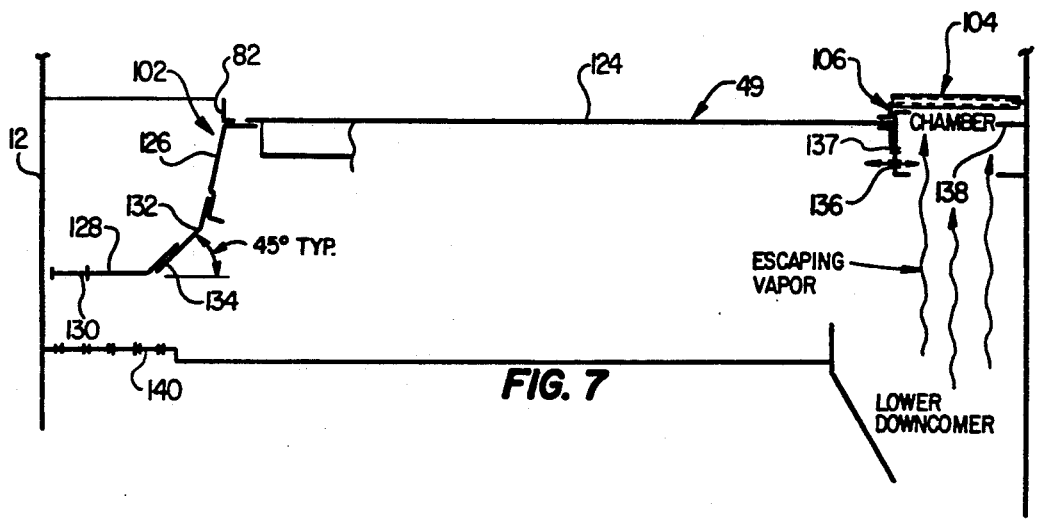
FIG. 7 is a diagrammatic, side elevational view of the downcomer-tray assembly of FIG. 6.

Referring now to FIG. 7, there is shown a side elevational, cross sectional view of the tray 49 of FIG. 6. The weir 82 is shown to be constructed of a generally L-shaped member adjacent the downcomer 102. The downcomer 102 on the left side of FIG. 7 is constructed with first sloping wall 126 which engages a second angulated sloping wall region 132. The angulated wall region 132 has a mitered section 134 which permits egress of ascending vapor from the raised panel thereberneath with a horizontal flow vector. An angulated downcomer may be provided in this vicinity for effecting vapor passage from the raised inlet panel. The raised inlet panel 104 on the right side of FIG. 7 illustrates the orientation of this preferential vapor flow area immediately above the downcomer disposed therebelow. Gas entrained in liquid which flows into the downcomer and is released must find a region of escape. The escaping vapor is illustrated rising up to and through the panel 104. A support beam 136 is shown to form a chamber beneath the panel 104. Apertures 137 are formed through the side wall of beam 136 to serve as vapor flow equalization holes. If excessive vapor fills the chamber beneath panel 104 it can escape outwardly through flow equalization holes 137.

Figure 8:
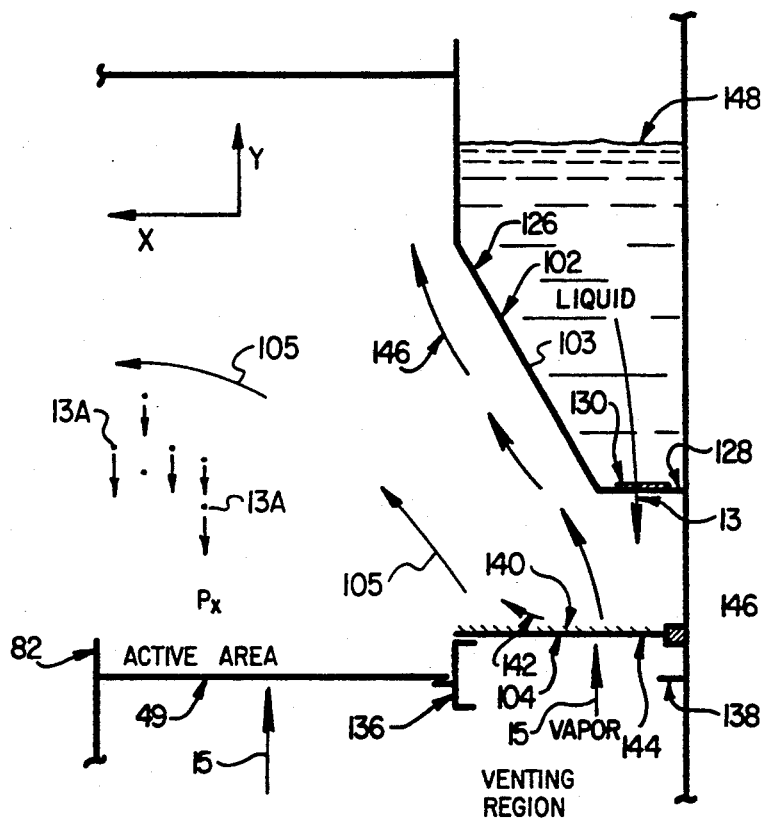
FIG. 8 is an enlarged, side elevational, fragmentary view of a downcomer-tray area of FIG. 4 and diagrammatical representation of the vapor venting of the present invention.

Referring now to FIG. 8, there is shown an enlarged, side elevational cross sectional view of the downcomer 102 and raised inlet panel 104 of FIG. 4. The downcomer 102 is seen to incorporate the select tapered wall region 103 which may be used to increase vapor flow efficiency as discussed above. The slots 130 are formed in the lower region thereof for discharging liquid 13 directly onto panel 104 into engagement with ascending vapor 15. The inlet panel 104 of this particular embodiment, is seen to be formed with a plurality of directional flow vanes 140 providing directionalized vapor flow in the direction of arrows 105, 142, and 146. The vanes 140 may be formed in a plate section 144 which may be comprised of louvered metal such as preexpanded metal Or the like. The vanes 140, when utilized, facilitate directionalizing the vapor flow. When vanes 140 are used with a slanted downcomer wall 103, the horizontal vector imparted to the vented vapor flow can be quite pronounced, as discussed in more detail below. As is shown in the present drawing, the panel is raised above the tray deck 49 and is open to the underlying tray and downcomer for venting vapor 15 directly therefrom. In this particular configuration a dynamic seal is thus created in the downcomer 102 by maintaining a liquid head 148 above the discharge slots 130. These features will be discussed in more detail below.

Figure 9:
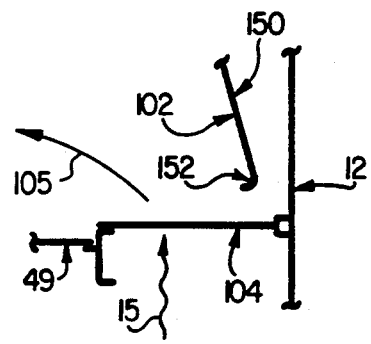
FIG. 9 is an alternative embodiment of the downcomer of FIG. 8.

Referring now to FIG. 9, there is shown an alternative embodiment of the downcomer panel assembly in FIG. 8. The downcomer mitered section 134 is constructed with a sloped section 150 terminating in a Venturi flange 152. The entire downcomer region adjacent Venturi flange 152 may remain open for purposes of vectoring liquid therefrom, creating a lower pressure area therein, and venting vapor 15 into the area above tray 49 with a horizontal flow characteristic as shown by arrow 105.

Figure 10:
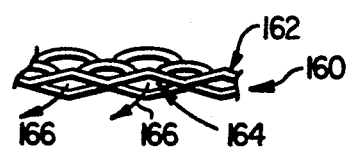
FIG. 10 is an enlarged, fragmentary perspective view of the active inlet area of FIG. 4.

Referring now to FIG. 10, there is shown an enlarged, fragmentary perspective view of a section of the panel of the plate 144 of FIG. 8. In this particular configuration a preexpanded type of metal plate is used having a plurality of twisted lands 162 forming slotted apertures 164 therein. Any number of louver designs could be used. Vapor passes therethrough in the direction of arrow 166 due to the angular relationship between the twisted lands 162 and the slitted apertures 164. This panel section 160 comprises but one embodiment of the present invention for affording select vapor passage from the raised inlet panel of the present invention.

Figure 11:
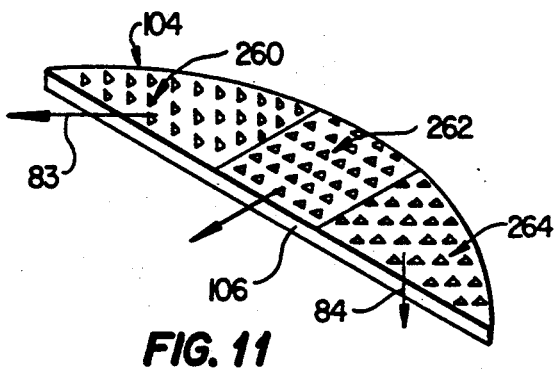
FIG. 11 is a top plan view of an alternative embodiment of the active inlet panel of FIG. 4.

Referring now to FIG. 11, it may be seen that a plurality of panels 260, 262, 264 may be incorporated in raised section 104. These panels utilize directional flow vanes and the central panel 262 vectors vapor directly across the plate 49 while outer panels 260 and 264 direct vapor flow outwardly thereof to reduce retrograde flow thereacross. In this manner, the downcomer 102 may be provided with increased efficiency and enhanced vapor liquid interaction. The raised, active inlet area 104 increases the total active area of the particular plate to which it is affixed and the directional flow vanes maximize vapor liquid contact as liquid is discharged directly from the downcomer. Utilization of a static seal in the downcomer further simplifies the construction and maximizes the efficiency of operation. The directional vanes are provided in the active inlet panels in the requisite directions for accommodating proper flow and maintaining flow equilibrium. This prevents retrograde flow prior to the liquid engaging the opposite downcomer 82 across the plate 49. These factors increase the efficiency of the plate. All of these effects enhance mass transfer efficiency while maintaining high capacity and they represent a marked improvement over the prior art.

Referring again to FIG. 8, the present invention affords the benefit of venting between trays. The venting occurs in the raised inlet region 140, disposed above an underlying downcomer, which permits the passage of vapor from the underlying downcomer and/or tray in a non-deleterious manner. The passage of excess vapor through the raised inlet 104 eliminates the need for such excess vapor to pass through the active tray area 49, which could create flow balance problems. Moreover, the vapor 15 passing through raised inlet 104 may be vectored in a direction 105 having a horizontal flow component. An X-Y diagram has been superimposed over the active tray 49 to illustrate that a substantial amount of vapor flow from the raised inlet area 104 will have some horizontal flow component X relative to its vertical flow component Y. Arrow 146 illustrates vapor 15 rising adjacent the angulated downcomer face 103. Its X component of flow is less than that shown for arrows 105, but more than that shown for ascending vapor 15 passing through the active area of tray 49. With a horizontal flow component, liquid droplets 13A entrained in the flow will have a much better chance of dropping out for mass/heat transfer in the tray area 49, a series of droplets 13A are diagrammatically shown for purposes of illustration of this point. Moreover, the velocity of vapor flow is much higher when region 104 is venting and relieving the tray pressure Py below that tray 49 that is much greater than tray pressure Px, above tray 49. Higher pressure Py can arise within the chamber described in FIG. 7 from disentrained vapor from the downcomer therebelow. The vented vapor engages and aerates the descending liquid 13, thus causing liquid entrainment in the vapor. With the aforesaid horizontal vapor flow characteristics the Y-flow component may be sufficiently low to permit the liquid droplets to fall out. Such an operational condition is more likely to occur with higher pressure tower applications. In the manner described above, both entrained liquid-in-vapor and entrained vapor-in-liquid are allowed to disperse without affecting the stability of the vapor-liquid flow between trays. Stabilized flow requires the proper balance between liquid flow down and vapor flowing up. Liquid may be entrained in the vapor, with high velocity, vertical vapor flow through liquid. Likewise, vapor may be entrained in the liquid as a byproduct of the commingling of the gas and liquid, particularly in high pressure applications. The entrained vapor is thus carried downwardly in the descending downcomer described in the Background of the Invention. The present invention permits the venting of the vapor released from the liquid in the underlying downcomer. The vented vapor is released through the raised, active inlet area thereabove and then vectored across the upper tray with a select flow characteristic which may be horizontal for facilitating release of liquid entrained in the vapor as a result of its engagement with the downcomer discharge and resulting aeration. This dual function entrainment release serves to stabilize the vapor-liquid flow in an efficient manner.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. An improved method of mixing vapor with liquid discharged from a downcomer of a process column onto an underlying cross flow tray with said column having a plurality of trays and downcomers spaced vertically one from the other, and maintaining liquid-vapor flow stability therein, wherein the improvement comprises forming said tray with an active inlet area being substantially uniformly raised and comprising upwardly extending portions of the tray itself, said raised area having vapor flow openings therein disposed beneath said discharge area of said downcomer, venting vapor through said uniformly raised, active inlet area from the downcomer and tray region thereunder, vectoring said vented vapor flow into engagement with said discharged liquid and outwardly from said inlet area and said downcomer and imparting a directional flow characteristic to said vented vapor adapted for dispersing said engaged liquid therefrom.

2. The method as set forth in claim 1, wherein said forming step includes the step of forming a plurality of directional flow vanes adjacent said vapor flow openings of said inlet area.

3. The method as set forth in claim 1 wherein said downcomer is formed with an angulated side wall which tapers downwardly to said tray below.

4. The method as set forth in claim 3 wherein said step of imparting a directional flow characteristic includes imparting a horizontal flow vector to said vented vapor.

5. An improved method of stabilizing vapor-liquid flows in a process column of the type wherein liquid is discharged from a downcomer of one of a plurality of trays onto an underlying tray of the type wherein said descending liquid mixes with ascending vapor flow through said tray, said improvement comprising the steps of forming a tray venting region with an active inlet area being substantially uniformly raised, to comprise upwardly extending portions of the tray itself, disposing said venting region beneath a discharge region of a first downcomer above said tray, and above a second downcomer below said tray, exposing vapor flow from beneath said tray and from said second downcomer therebelow to said venting region, venting exposed vapor through said venting region and into engagement with said liquid for stabilizing vapor-liquid flows between said trays, and imparting a directional flow characteristic to said vented vapor adapted for dispersing engaged liquid therefrom.

6. The method as set forth in claim 5 wherein the step of providing said active inlet area includes forming a plurality of directional vapor flow vanes for the directional venting of vapor.

7. The method as set forth in claim 5 wherein said first downcomer is formed with an angulated side wall which tapers downwardly toward said tray therebelow.

8. The method of claim 7 wherein said step of imparting a directional flow characteristic includes imparting a horizontal flow vector to said vented vapor.

9. The method as set forth in claim 5 and further including the step of constructing said first downcomer with a discharge region adapted for providing a dynamic seal against ascending vapor flow.

10. The method as set forth in claim 5 wherein said step of constructing said first downcomer includes the steps of providing a discharge outlet for said downcomer, disposing said discharge outlet along an outer region of said downcomer and maximizing the length of liquid flow from said discharge outlet across said tray.

11. The method as set forth in claim 5 wherein said step of providing a tray venting region includes the step of providing a chamber beneath said venting region, and perforating a side wall of said chamber for permitting vapor equalization flow therethrough.

* * * * *

UNITED STATES PATENT AND TRADEMARK OFFICE
CERTIFICATE OF CORRECTION

PATENT NO. : 5,106,556

DATED : April 21, 1992

INVENTOR(S) : Binkley, Thorngren, Gage, Bonilla and Beckman

It is certified that error appears in the above-identified patent and that said Letters Patent is hereby corrected as shown below:

On the title page, item [54]:

Insert "m" after the letter o in the word Downcoer

Col. 3 Line 58
Delete (4119) and Insert "419"

Col. 6 Line 27
Insert "FIG. 5 is an enlarged, side elevational cross sectional view of an active tray area taken along lines 5-5 of FIG. 4;

Col. 6, lines 25-26
Delete "view of an active tray area taken along lines 5-5 of FIG. 4;".

UNITED STATES PATENT AND TRADEMARK OFFICE
CERTIFICATE OF CORRECTION

PATENT NO. : 5,106,556

DATED : April 21, 1992

INVENTOR(S) : Binkley, Thorngren, Gage, Bonilla and Beckman

It is certified that error appears in the above-identified patent and that said Letters Patent is hereby corrected as shown below:

Col. 7 Line 18
Delete (O) and insert "o" in the word of

Col. 10 Line 14
Insert "4" after the word FIG.

Col. 10 Line 44
Delete (O) and insert "o" in the word of

Col. 11 Line 31
Delete (O) and insert "o" in the word or

Col. 14 Line 30
Insert "as set forth in" after the word method
Delete (of) after the word method Signed and Sealed this Eighth Day of September, 1992

Attest:

DOUGLAS B. COMER

*Attesting Officer*     *Acting Commissioner of Patents and Trademarks*